(12) United States Patent
Yang et al.

(10) Patent No.: US 10,572,212 B2
(45) Date of Patent: Feb. 25, 2020

(54) METHOD AND DEVICE FOR SHARING CONTENT

(71) Applicant: Samsung Electronics Co., Ltd., Suwon-si, Gyeonggi-do (KR)

(72) Inventors: Pil-seung Yang, Seoul (KR); Chan-hong Min, Yongin-si (KR); Young-ah Seong, Seoul (KR); Say Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 14/494,987

(22) Filed: Sep. 24, 2014

(65) Prior Publication Data
US 2015/0095798 A1   Apr. 2, 2015

(30) Foreign Application Priority Data

Sep. 27, 2013 (KR) ........................ 10-2013-0115709

(51) Int. Cl.
| | | |
|---|---|---|
| *G06F 3/0488* | (2013.01) | |
| *G06F 17/24* | (2006.01) | |
| *G06F 3/14* | (2006.01) | |
| *G06F 3/0481* | (2013.01) | |

(52) U.S. Cl.
CPC .......... *G06F 3/1454* (2013.01); *G06F 3/0481* (2013.01); *G06F 3/0488* (2013.01); *G06F 17/241* (2013.01); *G09G 2340/12* (2013.01)

(58) Field of Classification Search
CPC .... G06F 3/1454; G06F 3/0481; G06F 3/0488; G09G 2340/12
See application file for complete search history.

(56) References Cited

U.S. PATENT DOCUMENTS

| | | | | |
|---|---|---|---|---|
| 6,342,906 B1* | 1/2002 | Kumar | ................. | G06F 3/1454 709/201 |
| 6,687,878 B1* | 2/2004 | Eintracht | ............. | G06F 17/241 715/201 |
| 6,729,885 B2* | 5/2004 | Stuppy | .................. | G06Q 30/02 434/322 |
| 7,373,590 B2* | 5/2008 | Woolf | .................. | G06F 17/242 715/230 |
| 9,069,449 B2* | 6/2015 | Herold | ................ | G06Q 10/107 |
| 9,830,123 B2 | 11/2017 | Jung et al. | | |

(Continued)

FOREIGN PATENT DOCUMENTS

| | | |
|---|---|---|
| CN | 101924675 A | 12/2010 |
| EP | 2 261 793 B1 | 8/2017 |

OTHER PUBLICATIONS

Samsung Electronics Co., Ltd.; "Samsung School—Smart Education Solution"; Apr. 2013; http://www.samsung.com/global/business/business-images/resource/brochure/2013/04/SamsungSchoolBrochure0423-0.pdf.

*Primary Examiner* — Beau D Spratt
(74) *Attorney, Agent, or Firm* — Jefferson IP Law, LLP

(57) ABSTRACT

A content sharing method is provided. The content sharing method is performed by a display device connected to at least one user terminal. The content sharing method includes displaying content on the display device, receiving information included in a transparent layer of a first user terminal among the at least one user terminal from the first user terminal, and overlapping the transparent layer, including the information received from the first user terminal, on the displayed content.

24 Claims, 16 Drawing Sheets

(56) References Cited

U.S. PATENT DOCUMENTS

| | | | |
|---|---|---|---|
| 2001/0040584 A1 | 11/2001 | Deleeuw | |
| 2007/0020604 A1* | 1/2007 | Chulet | G09B 7/02 434/350 |
| 2009/0119590 A1 | 5/2009 | Kondziela et al. | |
| 2010/0271288 A1 | 10/2010 | Srinivasan et al. | |
| 2010/0313143 A1 | 12/2010 | Jung et al. | |
| 2012/0231441 A1* | 9/2012 | Parthasarathy | G09B 7/02 434/362 |
| 2012/0254773 A1* | 10/2012 | Viswanathan | G06F 3/0483 715/753 |
| 2012/0278695 A1* | 11/2012 | Ju | H04L 51/00 715/230 |
| 2012/0278738 A1 | 11/2012 | Kruse et al. | |
| 2013/0318465 A1* | 11/2013 | Cheng | G06F 3/0483 715/776 |
| 2014/0160153 A1* | 6/2014 | Singh | G06Q 10/101 345/629 |
| 2014/0281875 A1* | 9/2014 | Branton | G06F 17/241 715/230 |

* cited by examiner

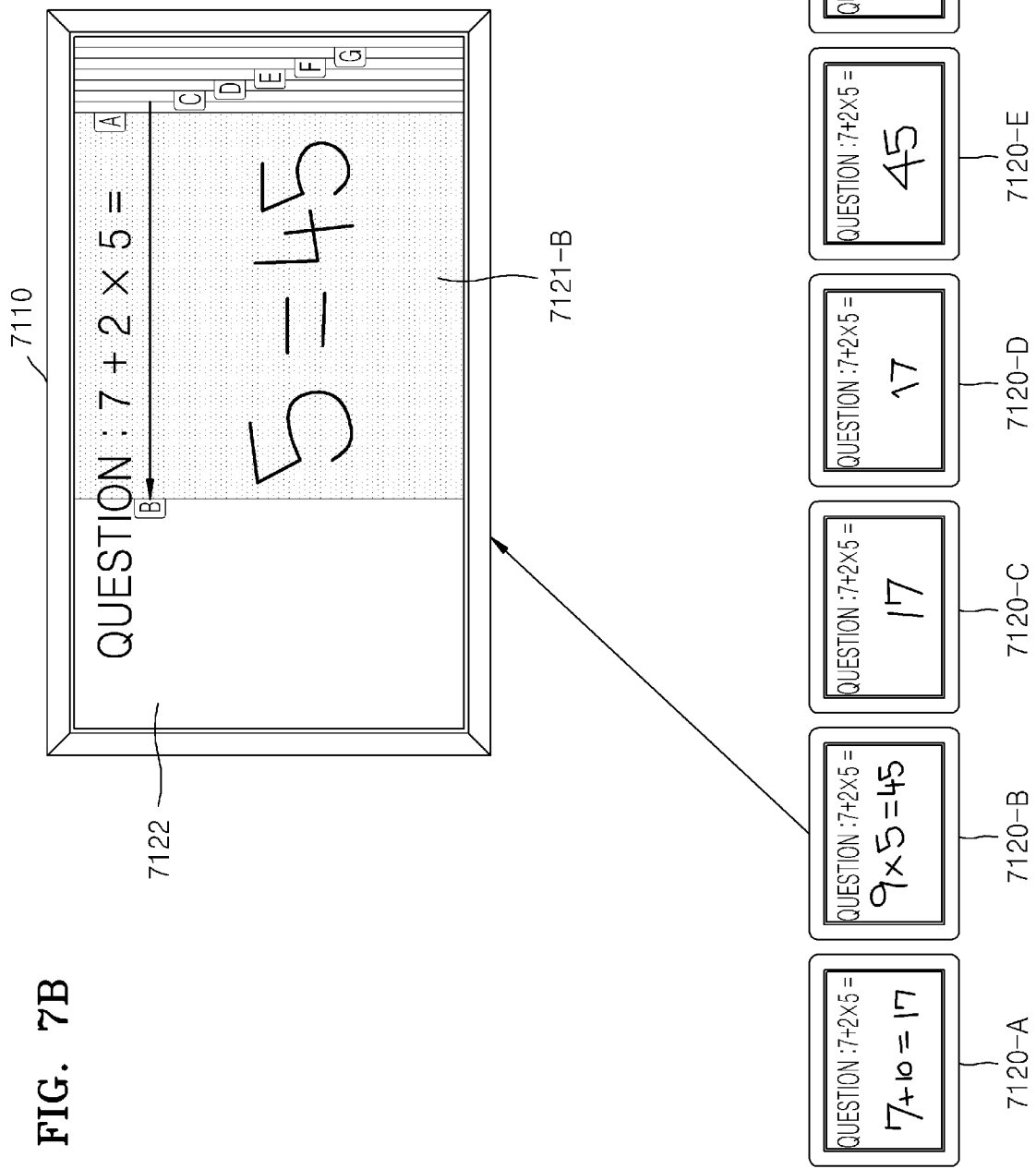

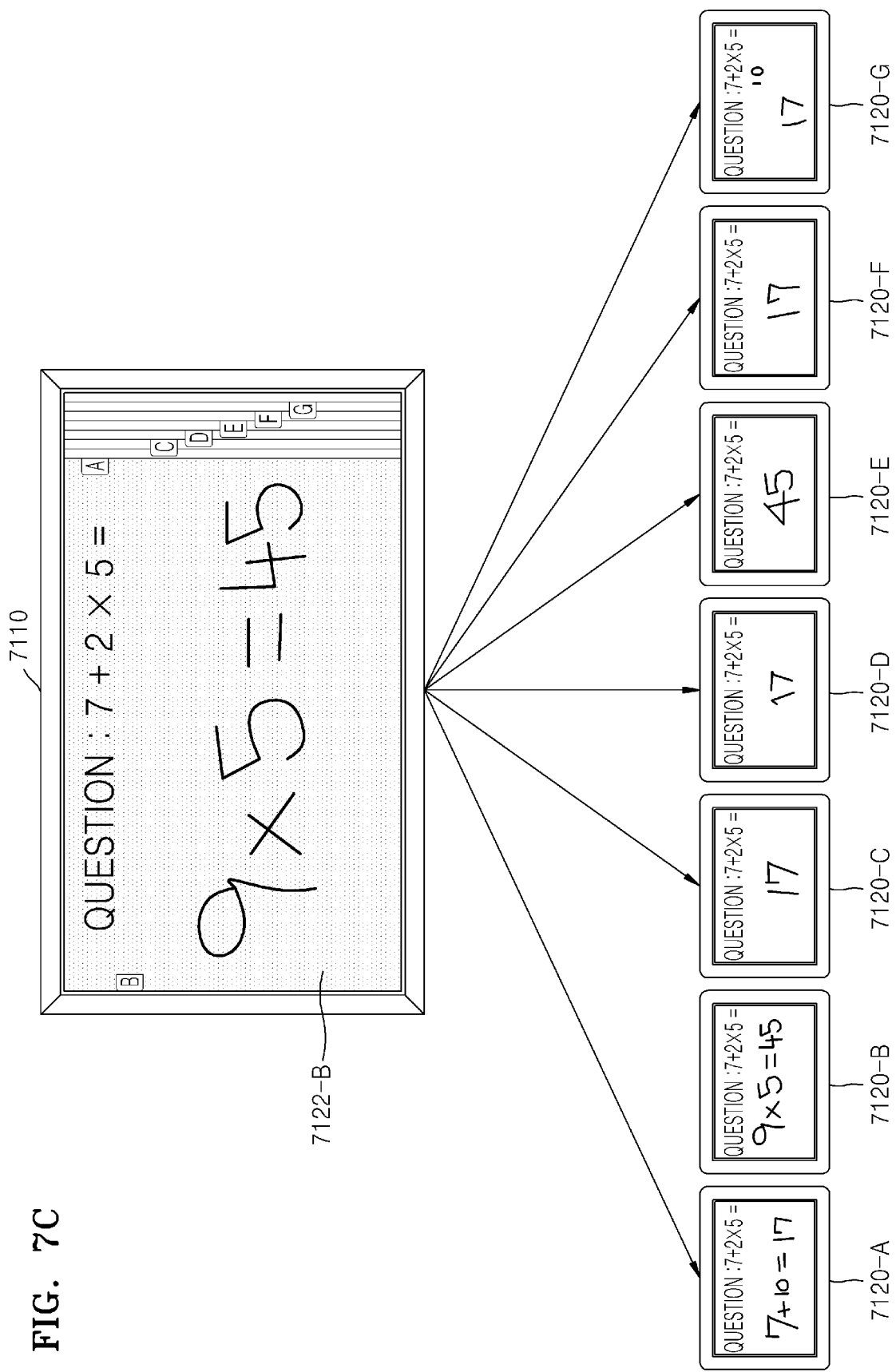

METHOD AND DEVICE FOR SHARING CONTENT

CROSS-REFERENCE TO RELATED APPLICATIONS(S)

This application claims the benefit under 35 U.S.C. § 119(a) of a Korean patent application filed on Sep. 27, 2013 in the Korean Intellectual Property Office and assigned Serial number 10-2013-0115709, the entire disclosure of which is hereby incorporated by reference.

TECHNICAL FIELD

The present disclosure relates to a method and device for sharing content between a plurality of devices. More particularly, the present disclosure relates to a method and device in which a device transmits or receives information (for example, handwritten information including writing content) related to content to or from another device.

BACKGROUND

When many devices share content, there is a need to share handwritten information related to the content. For example, when a meeting is done at school, a presentation is done by writing on a blackboard. Alternatively, a presentation is done by outputting content by using a display device such as a projector or a large-sized Liquid Crystal Display (LCD).

However, in this case, it is difficult to share information regarding content that is input by a presenter or information that is to be presented by an audience. For example, when a lecture is done at a school, there is a problem that it is required to output a student's assignment that is related to lecture text on a display device or to use another medium so as to share the assignment with other students.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a content sharing method of easily sharing a screen that is output on a device by using information related to content between devices.

Additional aspects will be set forth in part in the description which follows and, in part, will be apparent from the description, or may be learned by practice of the presented various embodiments.

In accordance with an aspect of the present disclosure, a content sharing method performed by a display device connected to at least one user terminal is provided. The content sharing method includes displaying content on the display device, receiving information included in a transparent layer of a first user terminal among the at least one user terminal from the first user terminal, and overlapping the transparent layer of the first user terminal, including the information received from the first user terminal, on the displayed content, wherein the at least one user terminal outputs the content to share a screen displayed on the display device.

The information included in the transparent layer of the first user terminal may include first handwritten information that is input to the first user terminal.

The content sharing method may further include providing the information received from the first user terminal to a second user terminal that outputs the displayed content.

The content sharing method may further include receiving information included in a transparent layer of the second user terminal from the second user terminal, wherein the information received from the second user terminal includes second handwritten information that is input to the second user terminal.

The content sharing method may further include overlapping the transparent layer of the second user terminal, including the information received from the second user terminal, on the content on which the transparent layer of the first user terminal, including the information received from the first user terminal, overlaps.

The content sharing method may further include displaying a first button for receiving an input of selecting the information received from the first user terminal and a second button for receiving an input of selecting the information received from the second user terminal on the display device, wherein the overlapping of the transparent layer of the first user terminal, including the information received from the first user terminal, on the displayed content includes when information for selecting the first button is input to the display device, overlapping the transparent layer of the first user terminal, including the information received from the first user terminal, on the displayed content.

The content sharing method may further include receiving a transparent layer output request from the first user terminal, and displaying the first and second buttons to be distinguished from each other when the transparent layer output request from the first user terminal is received.

The first button may indicate identification information of the first user terminal, and the second button may indicate identification information of the second user terminal.

The content sharing method may further include, if third handwritten information is input with respect to the transparent layer of the first user terminal that overlaps on the displayed content, transmitting the third handwritten information to the first user terminal.

In accordance with another aspect of the present disclosure, a content sharing method performed by a first user terminal that outputs content to share a screen displayed on a display device is provided. The content sharing method includes displaying the content on the first user terminal, overlapping a transparent layer of the first user terminal, including first handwritten information that is input to the first user terminal, on the displayed content transmitting the first handwritten information included in the transparent layer of the first user terminal to the display device.

The transmitting of the first handwritten information included in the transparent layer of the first user terminal to the display device may include determining a property of the transparent layer of the first user terminal and transmitting the first handwritten information included in the transparent layer of the first user terminal to the display device according to the property of the transparent layer of the first user terminal, wherein the property of the transparent layer of the first user terminal indicates if the transparent layer of the first user terminal is shareable.

The content sharing method may further include receiving information included in a transparent layer of a second user terminal among at least one terminal from the display device, and overlapping the information received from the display device on the displayed content, wherein the information received from the display device includes second handwritten information that is input to the second user terminal.

The overlapping of the information received from the display device on the displayed content may include replacing the information included in the transparent layer of the first user terminal with the information received from the display device.

The information included in the transparent layer of the first user terminal may further include identification information of the first user terminal.

The content sharing method may further include receiving third handwritten information that is input with respect to a transparent layer of the display device from the display device, and updating the transparent layer of the display device that overlaps the content based on the third handwritten information.

In accordance with another aspect of the present disclosure, a display device for sharing content with at least one user terminal is provided. The display device includes a display unit configured to display the content, a communication unit configured to receive information included in a transparent layer of a first user terminal among the at least one user terminal from the first user terminal, and a control unit configured to control the display unit to overlap the transparent layer of the first user terminal, including the information received from the first user terminal, on the displayed content, wherein the at least one user terminal outputs the content to share a screen displayed on the display device.

The information included in the transparent layer of the first user terminal may include first handwritten information that is input to the first user terminal.

The communication unit may provide the information received from the first user terminal to a second user terminal that outputs the displayed content.

The communication unit may receive information included in a transparent layer of the second user terminal from the second user terminal, and wherein the information received from the second user terminal includes second handwritten information that is input to the second user terminal.

The control unit may control the display unit to overlap the transparent layer of the second user terminal, including the information received from the second user terminal, on the content.

The display unit may display a first button for receiving an input of selecting the information received from the first user terminal and a second button for receiving an input of selecting the information received from the second user terminal, and wherein, when information for selecting the first button is input, the control unit controls the display unit to overlap the transparent layer, including the information received from the first user terminal, on the displayed content.

The communication unit may receive a transparent layer output request from the first user terminal, and wherein the control unit controls the display unit to display the first and second buttons to be distinguished from each other when the transparent layer output request is received.

The first button may indicate identification information of the first user terminal, and the second button indicates identification information of the second user terminal.

If third handwritten information is input to the transparent layer of the first user terminal that overlaps on the displayed content, the control unit may transmit the third handwritten information to the first user terminal.

In accordance with another aspect of the present disclosure, a first user terminal that outputs content to share a screen displayed on a display device is provided. The first user terminal includes a display unit configured to display the content, a control unit configured to control the display unit to overlap a transparent layer of the first user terminal, including first handwritten information that is input to the first user terminal, on the displayed content, a communication unit configured to transmit the first handwritten information included in the transparent layer of the first user terminal to the display device.

The control unit may determine a property of the transparent layer and controls the communication unit to transmit the first handwritten information included in the transparent layer of the first user terminal to the display device according to the property of the transparent layer of the first user terminal, wherein the property of the transparent layer of the first user terminal indicates if the transparent layer of the first user terminal is shareable.

The communication unit may receive information included in a transparent layer of a second user terminal among at least one terminal from the display device, wherein the control unit controls the display unit to overlap the information received from the display device on the content, and wherein the information received from the display device includes second handwritten information that is input to the second user terminal.

The control unit may replace the information included in the transparent layer that overlaps the content with the information received from the display device.

The information included in the transparent layer may further include identification information of the first user terminal.

The communication unit may receive third handwritten information that is input to a transparent layer of the display device from the display device, and wherein the control unit updates the transparent layer of the first user terminal that overlaps the content, based on the third handwritten information.

In accordance with another aspect of the present disclosure, a non-transitory computer-readable recording medium having recorded thereon a computer program for executing the method is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which:

FIGS. 7A, 7B, and 7C illustrate a method of sharing a screen between a display device and a plurality of user terminals according to an embodiment of the present disclosure;

Throughout the drawings, it should be noted that like reference numbers are used to depict the same or similar elements, features, and structures.

DETAILED DESCRIPTION

Figure 1:
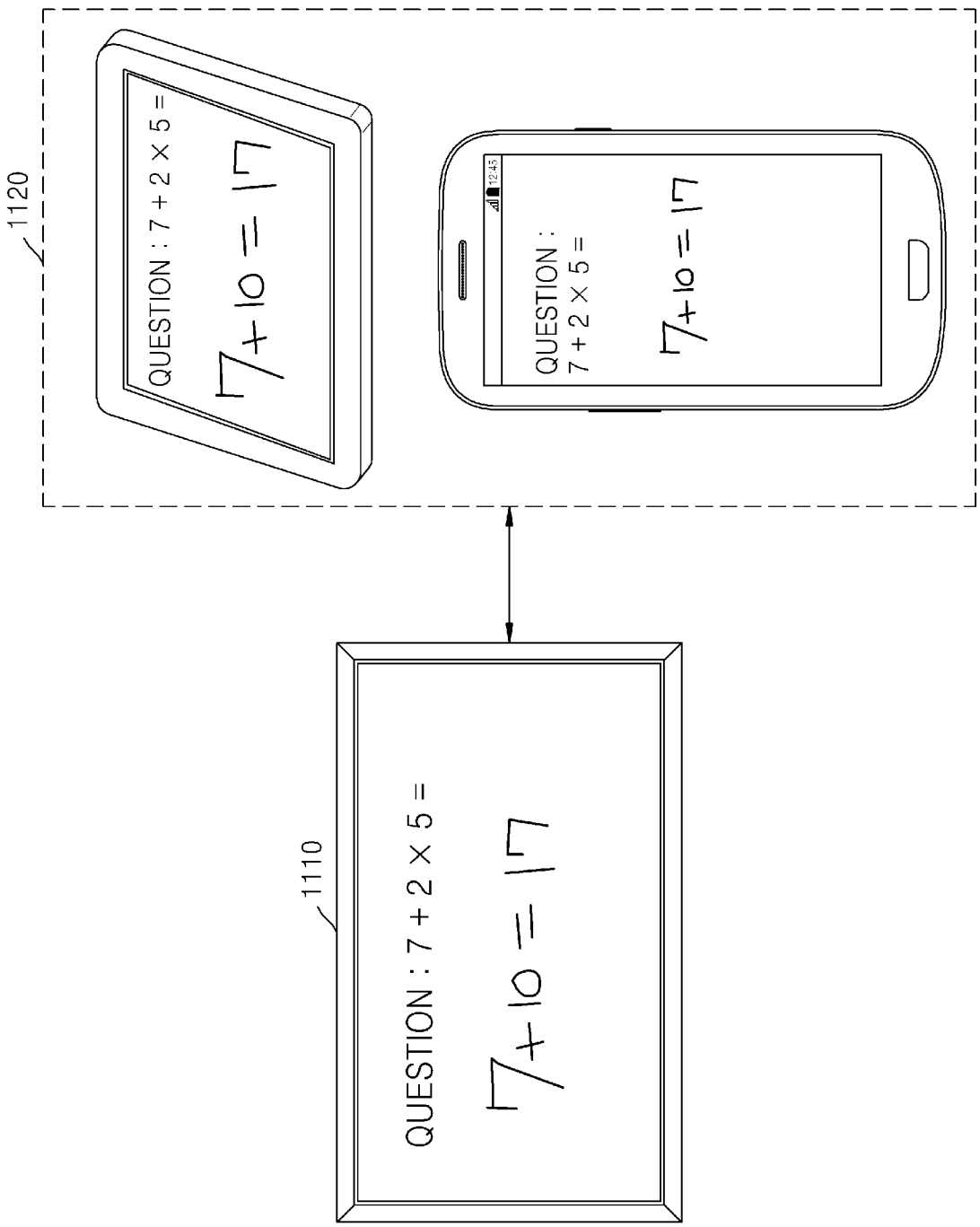
FIG. 1 illustrates a display device and a user terminal that share a screen according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements. When it is described that an element is "coupled" to another element, an element is "physically connected directly to" another element and "data may be transmitted and received by wired or wireless communication" as well.

Throughout the specification, a "transparent layer" refers to data that may overlap on content such as handwritten information. For example, a display device may display a presentation document including a mathematics question and overlap a transparent layer, including a question solution input by a user, on the presentation document by using a stylus pen. In this case, the display device may display the question solution input by using the stylus pen on the mathematics question. However, the present disclosure is not limited thereto. The "transparent layer" of the present disclosure may include at least one of various types of information that may be displayed such as handwritten information, an image, and a moving image.

Throughout the specification, "overlapping" of a transparent layer on content refers to displaying of data included in the transparent layer on the content when the content is being displayed. For example, overlapping of a transparent layer, including handwritten information, on content in the format of a document may refer to displaying a handwritten image on the document.

Throughout the specification, "handwritten information" may include information regarding a position of a line or a point according to a position input by a user by using an electronic pen. Although the "handwritten information" is stated in the present specification for convenience of description, the "handwritten information" may be composed of different types of information such as an image, a moving image, and a text.

Unless explicitly described to the contrary, transmitting or selecting a "transparent layer" in the present specification refers to transmitting or selecting the transparent layer itself and transmitting or selecting information included in the transparent layer.

Expressions such as "at least one of," when preceding a list of elements, modify the entire list of elements and do not modify the individual elements of the list.

FIG. 1 illustrates a display device and a user terminal that share a screen according to an embodiment of the present disclosure.

Referring to FIG. 1, the display device 1110 may display content. In this regard, the content refers to information that may be visually output. For example, the content may include a presentation document, a document created by using a word processor, a moving image, or a still image, but is not limited thereto.

The display device 1110 may be implemented as an electronic blackboard, a Liquid Crystal Display (LCD) equipped with a touch screen, a tablet PC, or a smartphone, but is not limited thereto. The display device 1110 may include a large-sized display device to provide content to multiple users.

The display device 1110 according to an embodiment of the present disclosure may be connected to at least one user terminal 1120. The display device 1110 may be connected to the user terminal 1120 by wired or wireless communication. For example, the display device 1110 may be connected to the user terminal 1120 by wired communication such as Power Line Communication (PLC), an intranet, the Internet, and a Local Area Network (LAN), near distance wireless communication according to a Bluetooth communication standard, Wireless Fidelity (WiFi), and Wireless communication such as a wireless LAN (WLAN).

The user terminal 1120 may output content to share a screen displayed on the display device 1110. That is, the user terminal 1120 and the screen output on the display device 1110 may be synchronized with each other. For example, when the display device 1110 outputs a $3^{rd}$ page of a presentation document, the user terminal 1120 may output the $3^{rd}$ page of the presentation document. When a document displayed on the screen of the display device 1110 is changed to a $4^{th}$ page of the presentation document, the user terminal 11120 may output the $4^{th}$ page of the presentation document. When the number 7 as handwritten information is input to the display device 1110, the user terminal 1120 may immediately display the number 7 input to the display device 1110.

The user terminal 1120 may be implemented as an electronic blackboard, an LCD equipped with a touch screen, a tablet PC, or a smartphone, but is not limited thereto.

Figure 2:
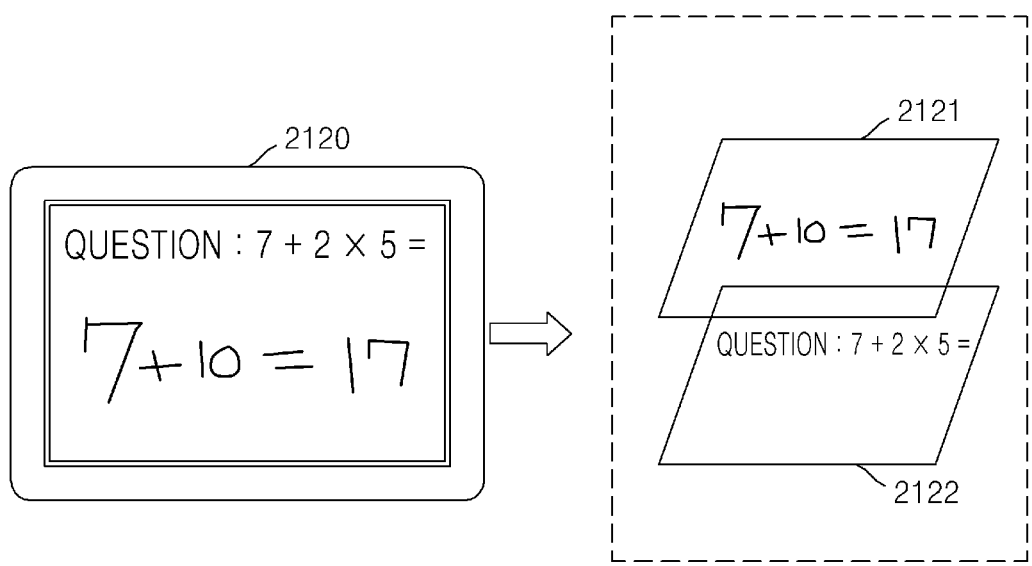
FIG. 2 illustrates content and a structure of a transparent layer according to an embodiment of the present disclosure.

FIG. 2 illustrates content and a structure of a transparent layer according to an embodiment of the present disclosure.

Referring to FIG. 2, a user terminal 2120 or a display device (not shown) according to an embodiment of the present disclosure may output the content 2122 and overlap the transparent layer 2121 on the content 2122.

For example, as shown in FIG. 2, the user terminal 2120 may overlap handwritten information input by a user by using a touch screen of the user terminal 2120 such as "7+10=17" on the content 2122 including characters "question: 7+2×5=".

Figure 3:
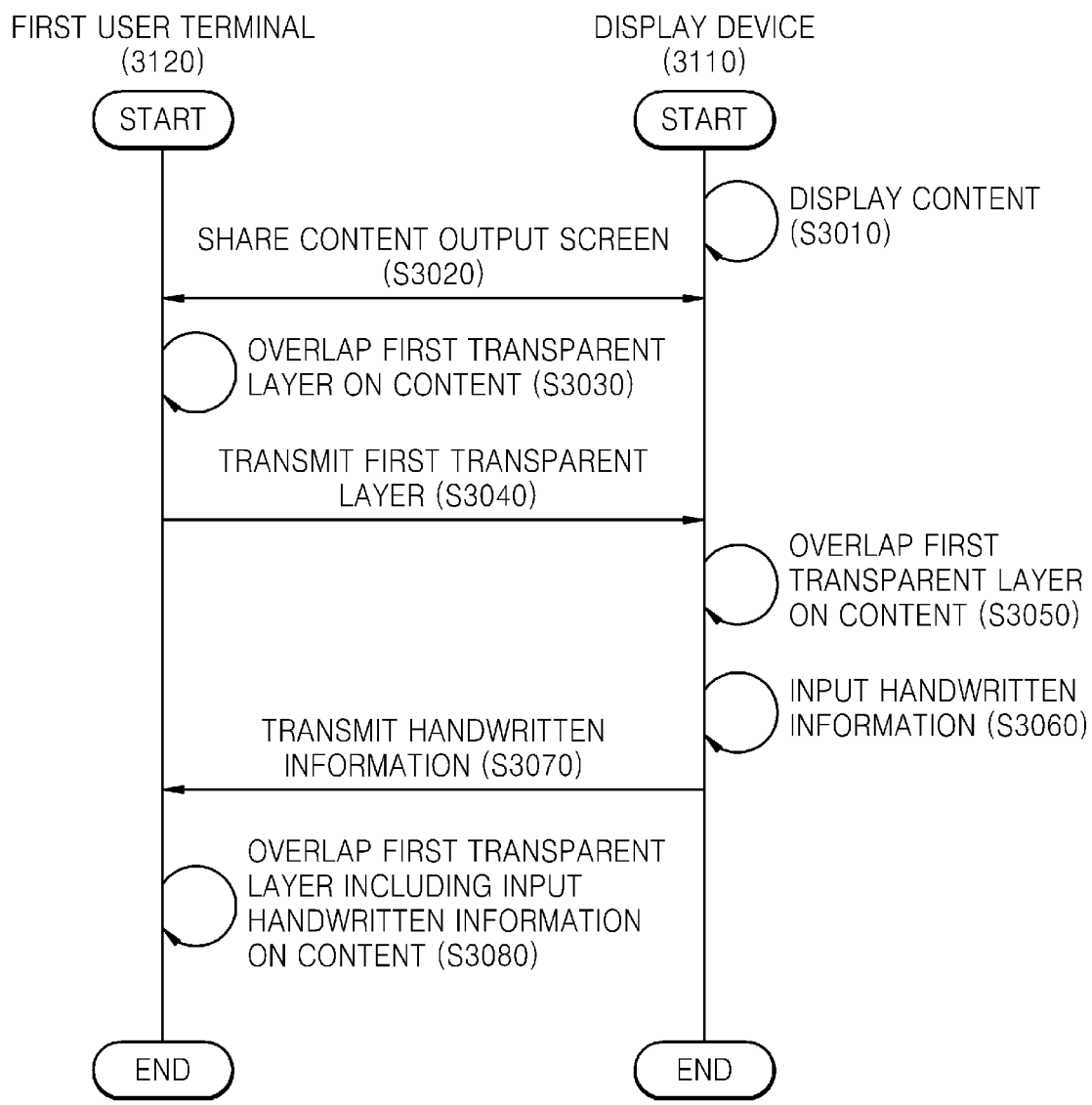
FIG. 3 is a flowchart illustrating a content sharing method according to an embodiment of the present disclosure.

FIG. 3 is a flowchart illustrating a content sharing method according to an embodiment of the present disclosure.

Referring to FIG. 3, a display device 3110 may be connected to a first user terminal 3120.

The display device 3110 may display content in operation S3010 and share a content output screen that is output on the display device 3110 with the first user terminal 3120 in operation S3020. When the content displayed on the display device 3110 is a page included in a document, the first user terminal 3120 may display the page included in the document that is displayed on the display device 3110. For example, when the display device 3110 displays a screen including "question: 7+2×5=", the first user terminal 3120 may display the screen including "question: 7+2×5=". Alternatively, when the content displayed on the display device 3110 is a frame of a moving image, the first user terminal 3120 may display the frame of the moving image.

The first user terminal 3120 may overlap a first transparent layer, including first handwritten information that is input to the first user terminal 3120, on the content in operation S3030. The first user terminal 3120 may transmit the first transparent layer, including the first handwritten information, to the display device 3110 in operation S3040. The display device 3110 that received the first transparent layer may overlap the first transparent layer on the displayed content.

According to another embodiment of the present disclosure, in operation S3040, the first user terminal 3120 may transmit information included in the first transparent layer other than the first transparent layer. In this regard, the information included in the first transparent layer refers to information displayed on a screen when the first transparent layer overlaps the content. For example, the information included in the first transparent layer may include the first handwritten information, an image, text, and the like. However, the present disclosure is not limited thereto. In operation S3040, when the display device 3110 receives the information included in the first transparent layer, in operation S3050, the display device 3110 may overlap the first transparent layer, including the received information, on the content.

When the first transparent layer is displayed, handwritten information regarding the content may be input to the display device 3110 in operation S3060. In this case, the handwritten information may be inserted into a transparent layer that overlaps the content.

In this regard, a plurality of transparent layers may overlap on the content. In this case, the handwritten information may be inserted into the transparent layers according to preset standards. For example, the transparent layers may have priorities. When the transparent layers overlap the content, and the handwritten information is input to the display device 3110, the handwritten information may be inserted into the transparent layer having the highest priority.

Thereafter, the display device 3110 may transmit the handwritten information that is input to the display device 3110 to the first user terminal 3120 in operation S3070. The handwritten information may be transmitted to the first user terminal 3120 in various ways. For example, the display device 3110 may transmit only the handwritten information or the first transparent layer into which the handwritten information is inserted to the first user terminal 3120.

Thereafter, the first user terminal 3120 may overlap the first transparent layer, including the handwritten information that is input to the display device 3110, on the content displayed on the first user terminal 3120 in operation S3080.

Figure 4:
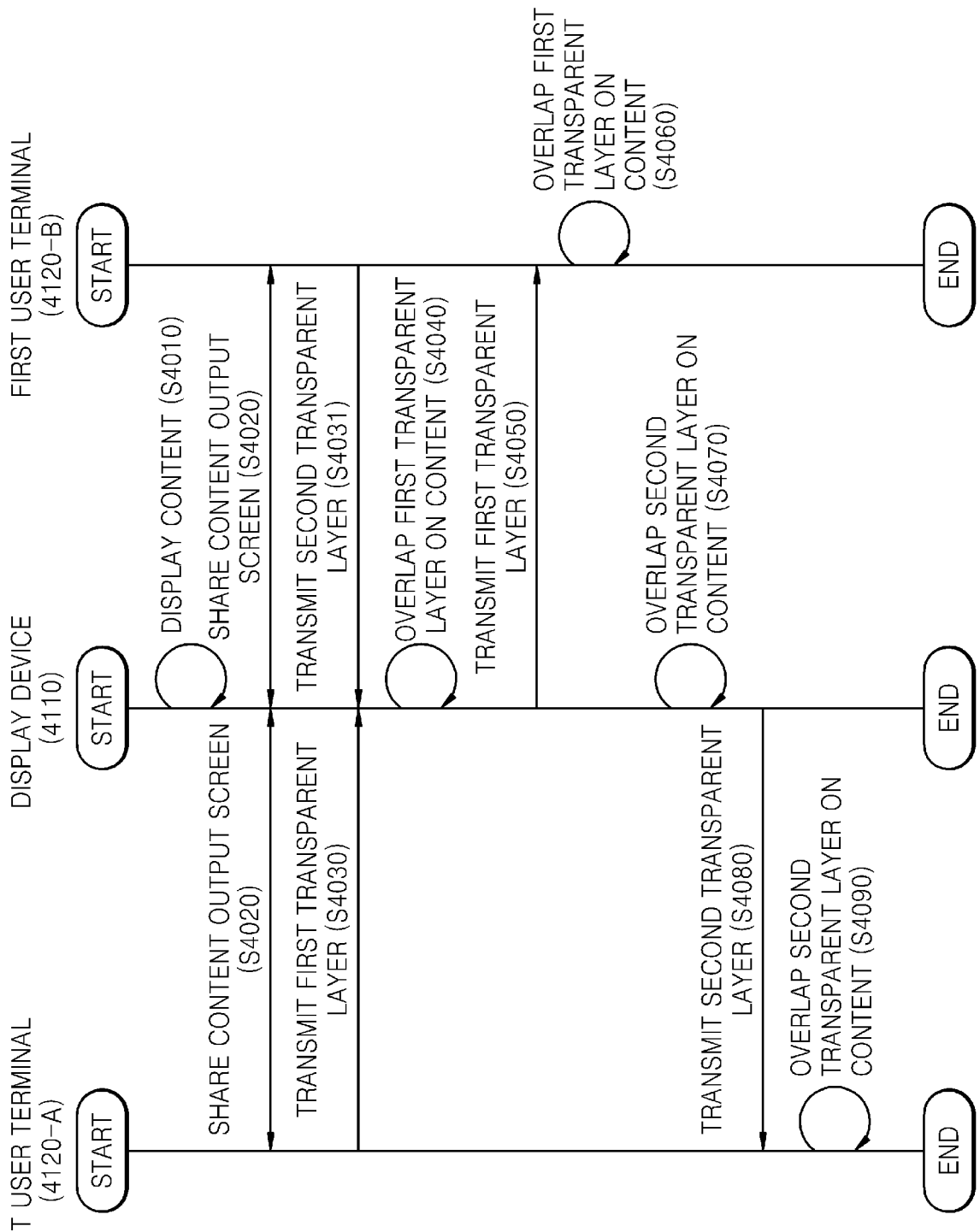
FIG. 4 is a flowchart illustrating a content sharing method according to another embodiment of the present disclosure.

FIG. 4 is a flowchart illustrating a content sharing method according to another embodiment of the present disclosure.

Referring to FIG. 4, a display device 4110 may be connected to a first user terminal 4120-A and a second user terminal 4120-B.

The display device 4110 may display content in operation S4010 and share a content output screen that is output on the display device 4110 with the first user terminal 4120-A and the second user terminal 4120-B in operation S4020.

The first user terminal 4120-A may transmit a first transparent layer, including first handwritten information that is input to the first user terminal 4120-A, to the display device 4110 in operation S4030. The second user terminal 4120-B may transmit a second transparent layer, including second handwritten information that is input to the second user terminal 4120-B, to the display device 4110 in operation S4031. According to another embodiment of the present disclosure, only the second handwritten information included in the second transparent layer, other than the second transparent layer itself, may be transmitted, but is not limited thereto.

Thereafter, the display device 4110 may select the first transparent layer from among the received first and second transparent layers and overlap the selected first transparent layer on the displayed content in operation S4040. In this regard, the display device 4110 may output a user interface for selecting at least one of a plurality of transparent layers and select the at least one transparent layer by using the output user interface. The user interface for selecting the at least one transparent layer will be described in detail with reference to FIGS. 7A through 7C later. Selecting of the first transparent layer refers to selecting of the first user terminal 4120-A that transmits the first handwritten information included in the first transparent layer or selecting of the first handwritten information received from the first user terminal 4120-A. When the first user terminal 4120-A or the first handwritten information received from the first user terminal 4120-A is selected, the display device 4110 may overlap the first transparent layer, including the first handwritten information, received from the first user terminal 4120-A on the content.

According to an embodiment, the display device 4110 may transmit the first transparent layer to the second user terminal 4120-B in operation S4050. The second user terminal 4120-B that received the first transparent layer may overlap the received first transparent layer on the content in operation S4060. However, operations 4050 and 4060 are not indispensable. The first transparent layer may be shared only by the first user terminal 4120-A and the display device 4110.

According to an embodiment, when the first transparent layer overlaps the content, the display device 4110 may receive third handwritten information. When the third handwritten information is received, the display device 4110 may transmit the third handwritten information to at least one of the first user terminal 4120-A and the second user terminal 4120-B. In this regard, the display device 4110 may transmit only the third handwritten information or the first transparent layer into which the third handwritten information is inserted to at least one of the first user terminal 4120-A and the second user terminal 4120-B.

Thereafter, the display device 4110 may select the second transparent layer and overlap the selected second transparent layer on the content in operation S4070. In this regard, operation S4070 may be differently implemented according to various embodiments. For example, when the first transparent layer overlaps the content, the display device 4110 may overlap the second transparent layer on the content and the first transparent layer. As another example, the display device 4110 may delete the first transparent layer that overlaps the content and may overlap the second transparent layer on the content instead. Further, the display device 4110 may transmit the second transparent layer to the first user terminal 4120-A at operation S4080 and the first user terminal 4120-A may overlap the second transparent layer on the content in operation S4090.

Figure 5:
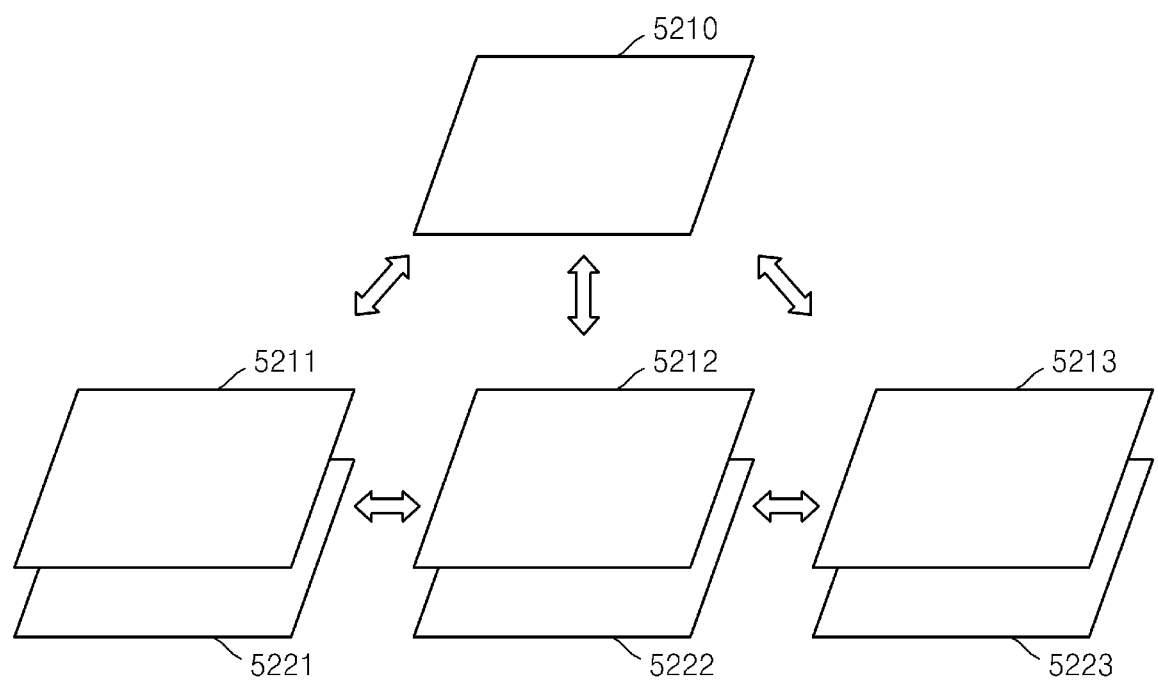
FIG. 5 illustrates a structure of a transparent layer according to an embodiment of the present disclosure.

FIG. 5 illustrates a structure of a transparent layer according to an embodiment of the present disclosure.

Referring to FIG. 5, the transparent layer according to the present embodiment may be divided into a general purpose layer 5210 and content-based layers 5211 through 5213 according to a property of the transparent layer.

The general purpose layer 5210 is a transparent layer that overlaps content that is output and is independently controlled with respect to the content. That is, when the general purpose layer 5210 overlaps a document that is output on a display device or a user terminal, although pages of the output document change, the general purpose layer 5210 that overlaps the content does not change. For example, a user may input handwritten information to the same transparent layer while turning the pages of the document.

The content-based layers 5211 through 5213 are transparent layers synchronized with the output content. That is, when a page 5221 of a document on which the content-based layer 5212 overlaps is changed to another page 5222, the display device or the user terminal may output the content-based layer 5212 corresponding to the changed page 5222 on the changed page 5222. When the page 5222 output by the display device or the user terminal is changed to another page 5223 again, the display device or the user terminal may overlap the content-based layer 5213 corresponding to the changed page 5223 on the changed page 5223.

Figure 6:
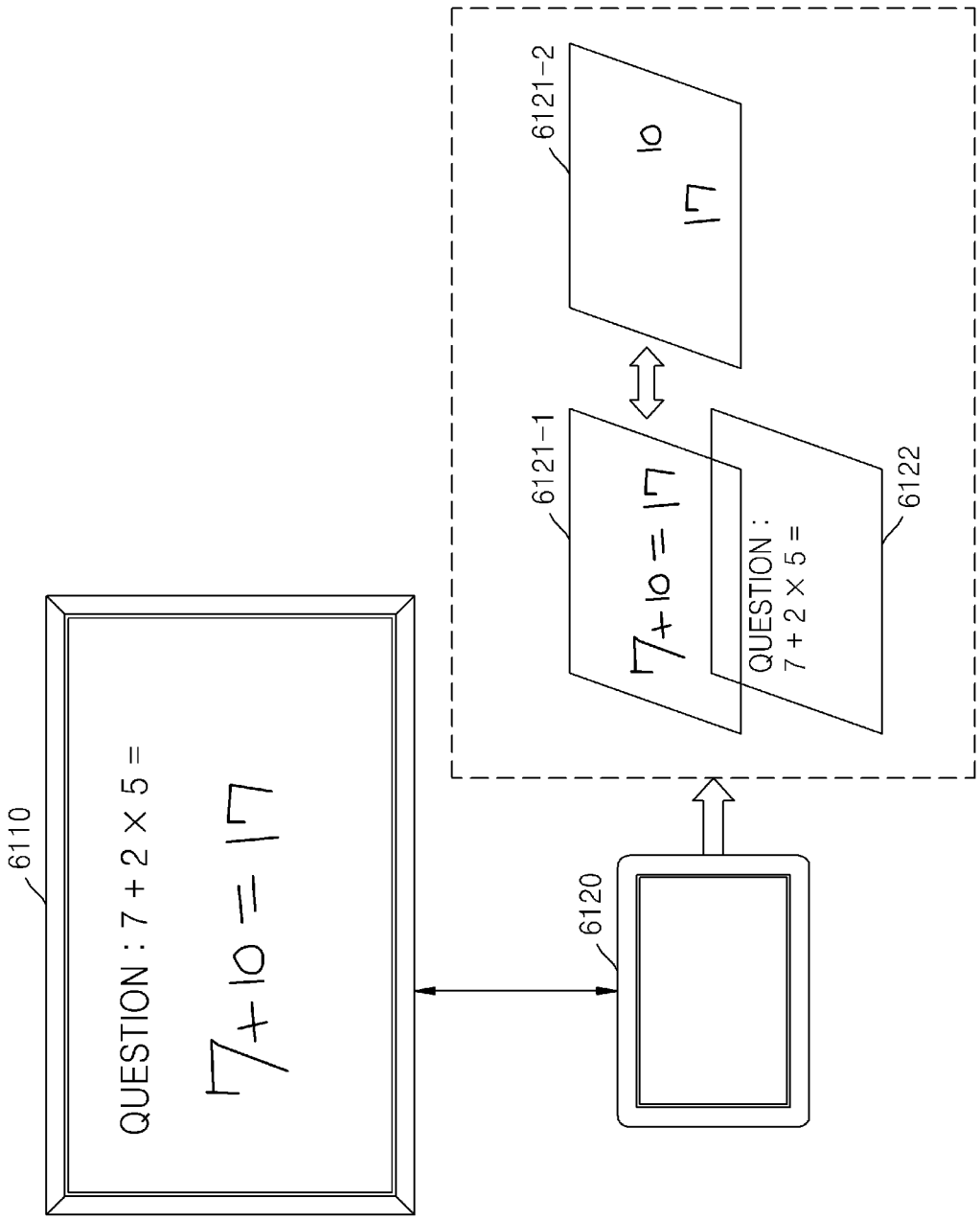
FIG. 6 illustrates a structure of a transparent layer according to another embodiment of the present disclosure.

FIG. 6 illustrates a structure of a transparent layer according to another embodiment of the present disclosure.

Referring to FIG. 6, the transparent layer according to the present embodiment may be divided into a sharing layer 6121-1 and a personal layer 6121-2 according to a property of the transparent layer.

The sharing layer 6121-1 refers to a transparent layer which displays content 6122 synchronized between a user terminal 6120 and a display device 6110. That is, when handwritten information is input to a transparent layer of the display device 6110, the handwritten information that is input to the transparent layer of the display device 6110 may be reflected in the sharing layer 6121-1 of the user terminal 6120. When handwritten information is input to the sharing layer 6121-1 of the user terminal 6120, the handwritten information that is input to the sharing layer 6121-1 of the user terminal 6120 may be reflected in the transparent layer of the display device 6110.

The personal layer 6121-2 refers to a layer that is not shared by the user terminal 6120 and the display device 6110. That is, although handwritten information is input to the personal layer 6121-2 of the display device 6120, the handwritten information is not reflected in the display device 6120.

For convenience of description, although the transparent layer of the user terminal 6120 is divided into the sharing layer 6121-1 and the personal layer 6121-2 in FIG. 6, the transparent layer of the display device 6110 may also be divided into a sharing layer and a personal layer.

Figure 7A:
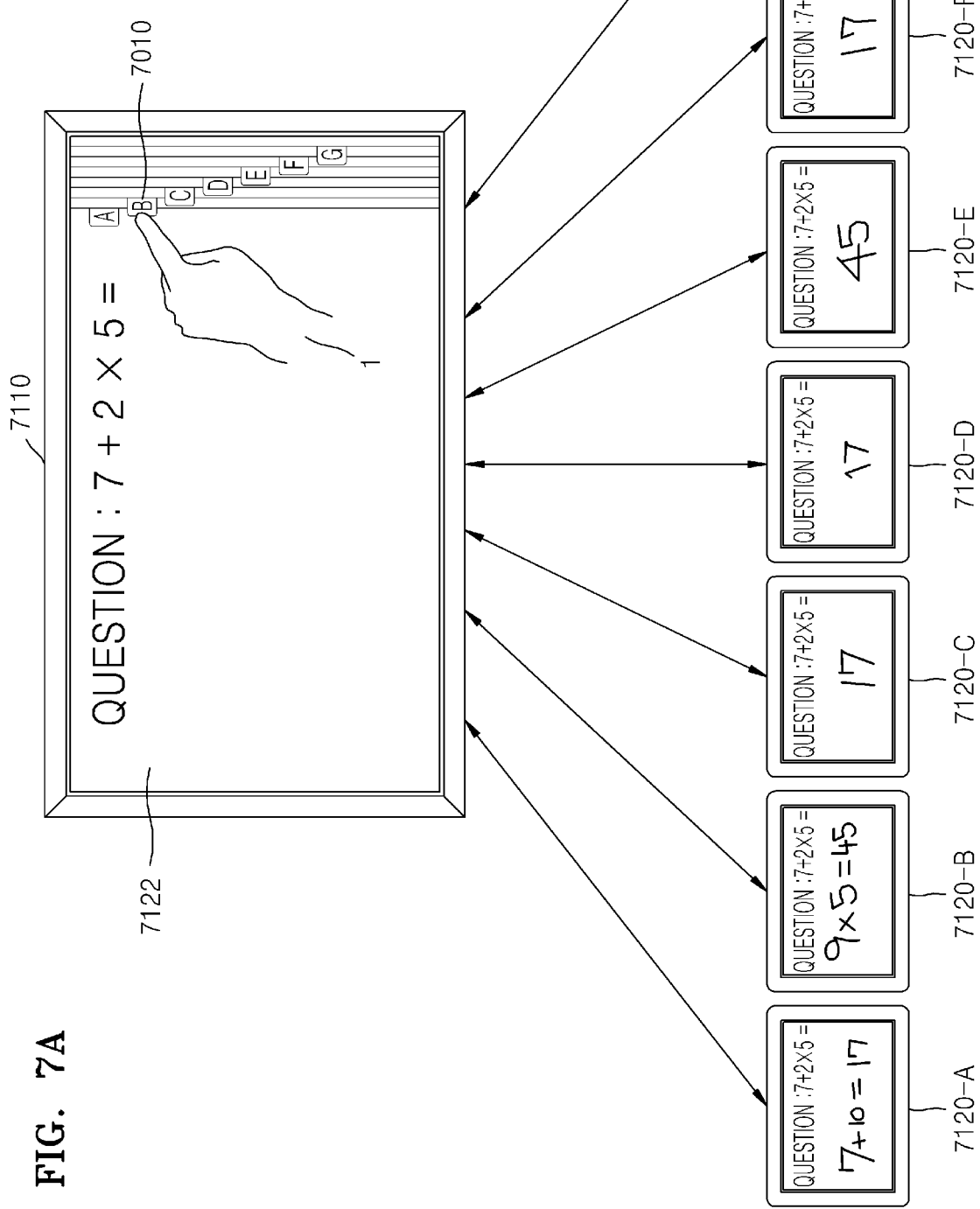

FIGS. 7A, 7B and 7C illustrate a method of sharing a screen between a display device and a plurality of user terminals according to an embodiment of the present disclosure.

Referring to FIG. 7A, the display device 7110 may be connected to the plurality of user terminals 7120-A through 7120-G. The display device 7110 and the plurality of user terminals 7120-A through 7120-G may output a synchronized screen. In this regard, the synchronized screen is a screen that displays content 7122.

Each of the user terminals 7120-A through 7120-G may transmit a transparent layer stored therein to the display device 7110. In this regard, the transparent layer refers to a transparent layer corresponding to the content 7122 that is displayed on the display device 7110 and the plurality of user terminals 7120-A through 7120-G.

According to the present embodiment, a control unit (not shown) of the display device 7110 may control a display unit of the display device 7110 to display a button for selecting at least one of the user terminals 7120-A through 7120-G. According to an embodiment, the display device 7110 may display buttons corresponding to a list of preset user terminals. In this regard, only a button corresponding to a user terminal connected to the display device 7110 among the user terminals included in the list may be enabled. For example, the display device 7110 may display the button corresponding to the user terminal connected to the display device 7110 in a predetermined color, and display a button corresponding to a user terminal that is not connected to the display device 7110 in a black color. According to another embodiment, the display device 7110 may display only the button corresponding to the user terminal connected to the display device 7110.

Based on the above, a user 1 may confirm whether a user of the user terminal connected to the display device 7110 has attended the class. For example, if a tablet PC of a student is connected to an electronic blackboard of a school by near distance wireless communication, a button that displays a name of the student may be enabled or displayed, and thus an attendance status may be confirmed.

According to an embodiment, the display device 7110 may include identification information of the user terminals 7120-A through 7120-G or receive the identification information of the user terminals 7120-A through 7120-G from the user terminals 7120-A through 7120-G. In this regard, the identification information of the user terminals 7120-A through 7120-G refers to information for identifying the user terminals 7120-A through 7120-G or users of the user terminals 7120-A through 7120-G. For example, the identification information of the user terminals 7120-A through 7120-G may include names of the users, intrinsic numbers provided to the user terminals 7120-A through 7120-G, images such as faces of the users, etc. The buttons displayed on the display device 7110 may indicate the identification information of the user terminals 7120-A through 7120-G corresponding to the buttons. For example, when a student connects a tablet PC to an electronic blackboard at a school, the tablet PC may transmit an image, including a face of the student, to the electronic blackboard. In this example, the electronic blackboard may display a button showing the face of the student.

According to another embodiment, the display device 7110 may display the buttons corresponding to the user terminals 7120-A through 7120-G connected to the display device 7110 as at least one group. For example, the electronic blackboard installed at the school may divide and display terminals of students connected to the electronic blackboard into terminals of a first section, terminals of a second section, and terminals of a third section. Alternatively, the display device 7110 may display buttons corresponding to the first through third sections, and, when the buttons are selected, the electronic blackboard may display buttons corresponding to terminals of sections corresponding to the selected buttons.

As shown in FIG. 7A, the display device 7110 may receive an input of selecting a button 7010 corresponding to the user terminal 7120-B from the user terminals 7120-A through 7120-G from the user 1. Referring to FIG. 7B, when the input of selecting the button 7010 corresponding to the user terminal 7120-B is received, the display device 7110 may overlap a transparent layer 7121-B received from the user terminal 7120-B on the content 7122.

According to an embodiment, the display device 7110 may output an animation, like unrolling the transparent layer 7121-B in a predetermined direction. However, this is intended to describe the present disclosure, and the present disclosure is not limited thereto.

Referring to FIG. 7C, the display device 7110 may transmit the selected transparent layer 7121-B displaying the content 7122-B to the user terminals 7120-A and 7120-C through 7120-G, except the user terminal 7120-B. However, this is merely an example. The transparent layer 7121-B may be shared and synchronized by the display device 7110 and the user terminal 7120-B.

According to an embodiment of the present disclosure of FIGS. 7A through 7C, students that have accomplished their assignments by using their terminals may easily submit and present their assignments via an electronic blackboard.

Figure 8:
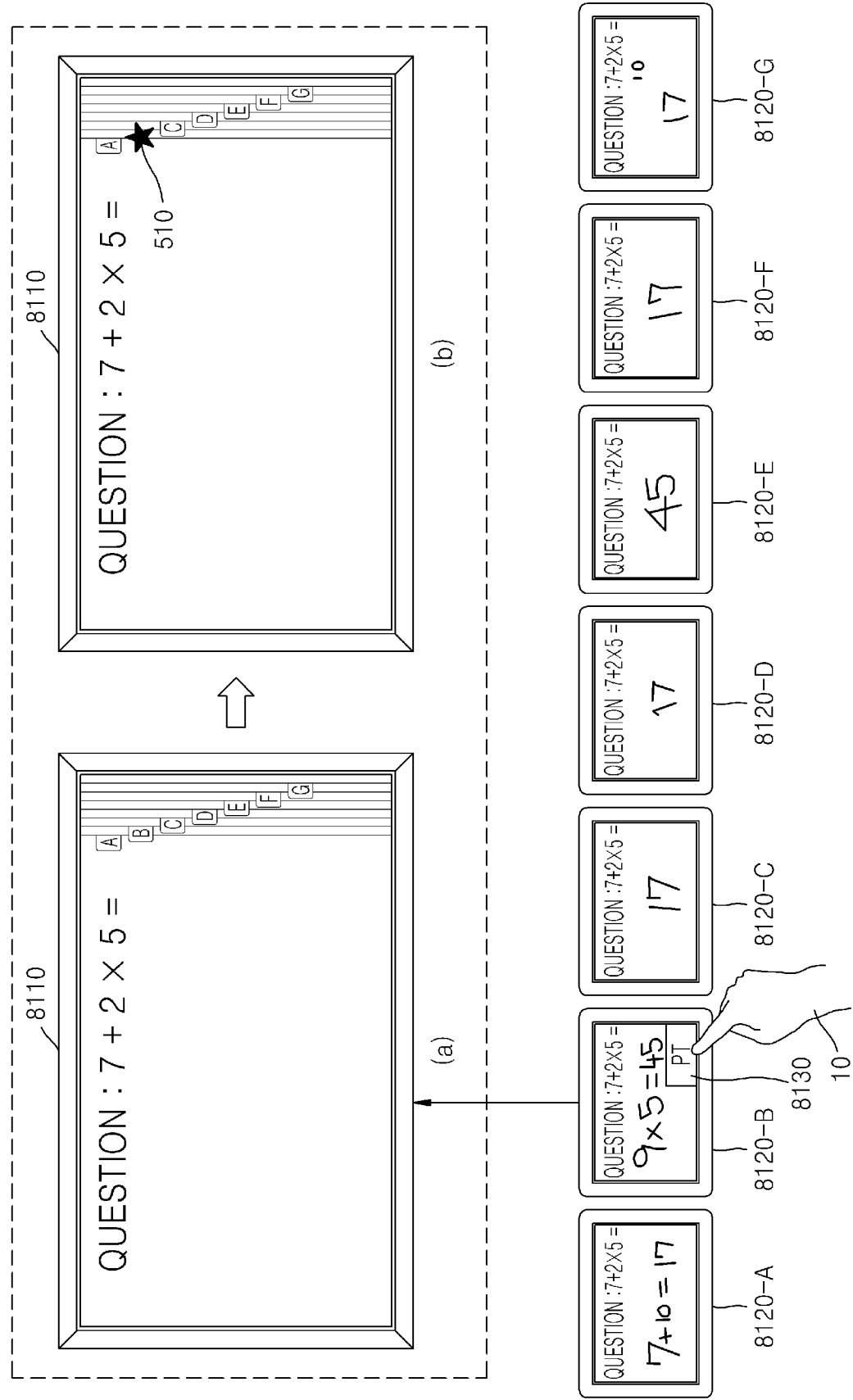
FIG. 8 illustrates a display device that displays buttons according to an embodiment of the present disclosure.

FIG. 8 illustrates a display device that displays buttons according to an embodiment of the present disclosure.

Referring to FIG. 8, user terminals 8120A through 8120-G shown differently that are connected to the display device 8110 may display the button 8130 corresponding to a transparent layer output request. As shown in (a) of FIG. 8, if the user terminal 8120-B receives an input of selecting the button 8130 from a user 10 of the user terminal 8120-B, the user terminal 8120-B may transmit the transparent layer output request to the display device 8110.

When the transparent layer output request is received, as shown in (b) of FIG. 8, the display device 8110 may display the button 510 corresponding to the user terminal 8120-B to be distinguished from buttons corresponding to the user terminals 8120-A and 8120-C through 8120-G. For example, if a student selects a presentation button to submit an assignment accomplished by using the student's terminal, an electronic blackboard may output an animation, like shaking of a student's hand, on a button corresponding to a terminal of the student.

Figure 9:
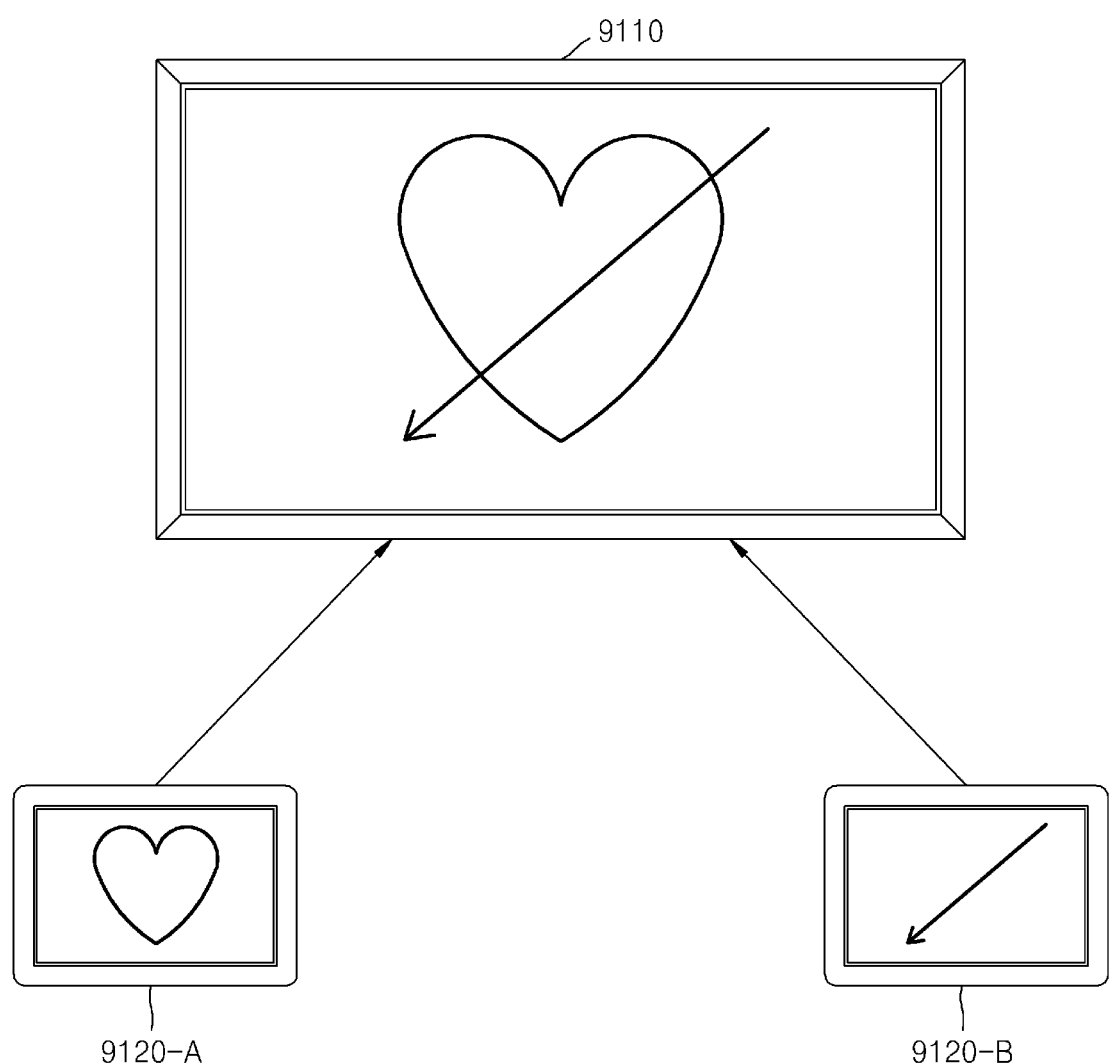
FIG. 9 illustrates a display device that overlaps transparent layers according to an embodiment of the present disclosure.

FIG. 9 illustrates a display device that overlaps transparent layers according to an embodiment of the present disclosure.

Referring to FIG. 9, the display device 9110 may receive a plurality of transparent layers from a plurality of user terminals 9120-A and 9120-B. According to an embodiment, the display device 9110 may overlap and display the received transparent layers.

In this case, the plurality of transparent layers may have priorities. The display device 9110 may display the plurality of transparent layers based on priorities. That is, when a priority of the transparent layer received from the user terminal 9120-A is higher than that of the transparent layer received from the user terminal 9120-B, information included in the transparent layer received from the user terminal 9120-A from among overlapping information may be displayed on information included in the transparent layer received from the user terminal 9120-B. However, this is only an example, and the present disclosure may be implemented in various ways like combining colors of overlapping transparent layers and displaying the transparent layers.

Figure 10:
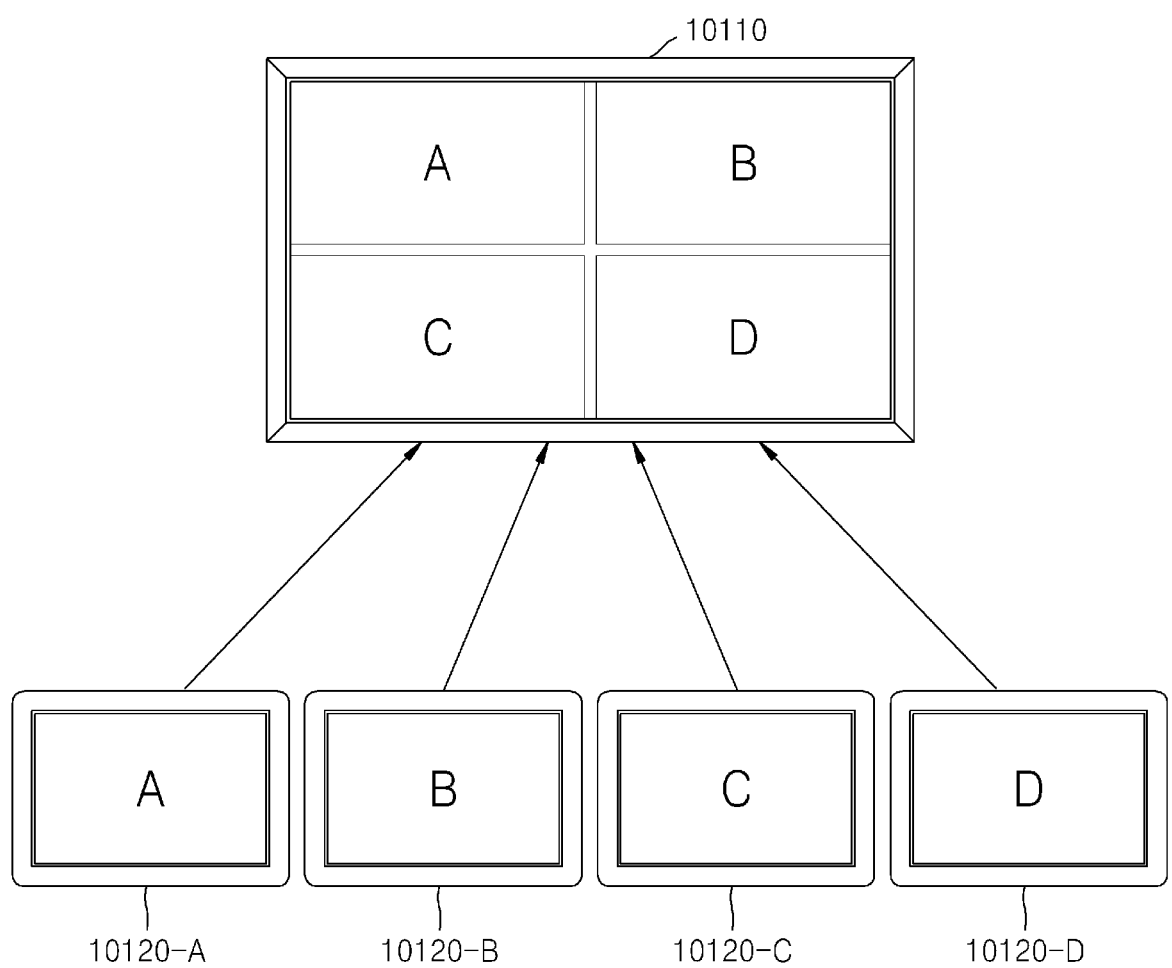
FIG. 10 illustrates a display device that overlaps transparent layers according to another embodiment of the present disclosure.

FIG. 10 illustrates a display device that overlaps transparent layers according to another embodiment of the present disclosure.

Referring to FIG. 10, the display device 10110 may receive a plurality of transparent layers from a plurality of user terminals 10120-A through 10120-D. According to an embodiment, the display device 10110 may split a display unit thereof into a plurality of regions and display the received transparent layers on the split regions.

According to an embodiment, the display device 10110 may receive an input of selecting at least one of the transparent layers displayed thereon and display content on which the selected at least one transparent layer overlaps.

Figure 11:
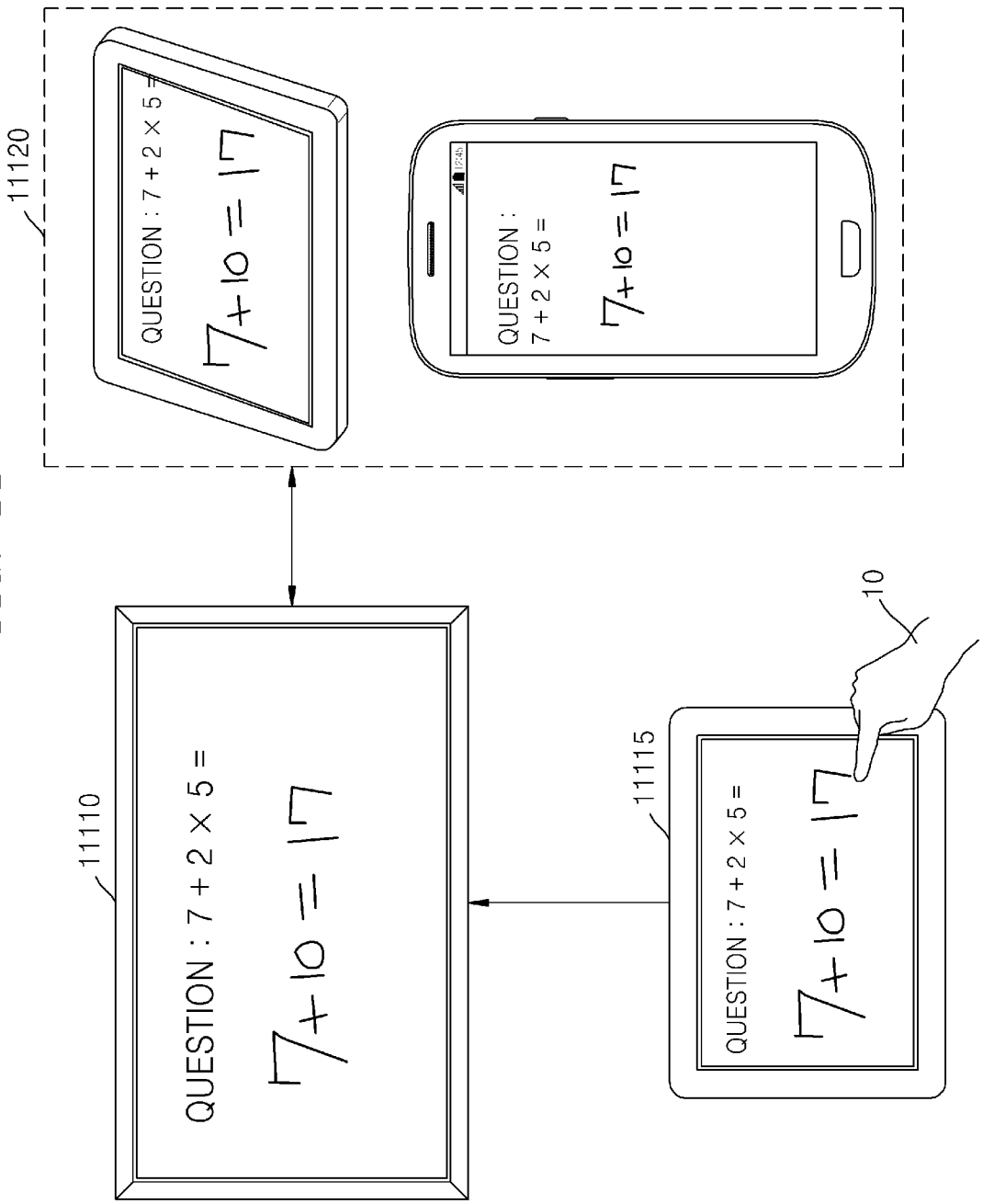
FIG. 11 illustrates a method of inputting handwritten information to a display device according to an embodiment of the present disclosure.

FIG. 11 illustrates a method of inputting handwritten information to a display device according to an embodiment of the present disclosure.

Referring to FIG. 11, the display device 11110 that shares content that is to be synchronously displayed with and a transparent layer with a user terminal 11120 may receive the handwritten information that is input by the user 10 by using a control device 11115. The display device 11110 may correct the transparent layer based on the handwritten information. For example, if a teacher inputs handwritten information by using a tablet PC, an electronic blackboard may receive and display the handwritten information that is input to the tablet PC from the tablet PC by using the transparent layer.

Figure 12:
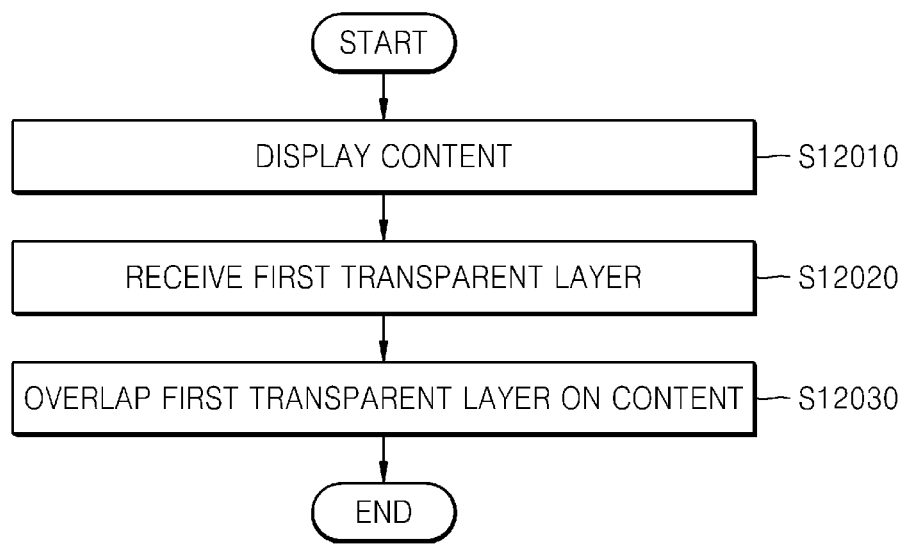
FIG. 12 is a flowchart illustrating a method in which a display device shares a transparent layer related to content according to an embodiment of the present disclosure.

FIG. 12 is a flowchart illustrating a method in which a display device shares a first transparent layer related to content according to an embodiment of the present disclosure.

Referring to FIG. 12, the display device may display the content in operation S12010. Thereafter, the display device may receive the first transparent layer from a user terminal connected thereto in operation S12020. In this regard, the first transparent layer refers to a transparent layer related to the content that is shared by the display device and the user terminal Thereafter, the display device may overlap the received first transparent layer on the content in operation S12030.

Figure 13:
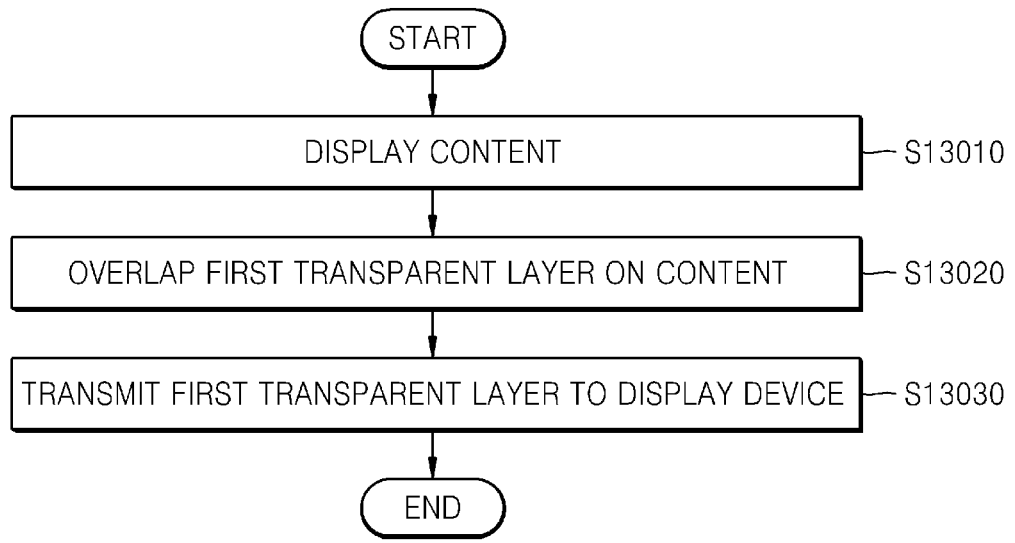
FIG. 13 is a flowchart illustrating a method in which a user terminal shares a transparent layer related to content according to an embodiment of the present disclosure.

FIG. 13 is a flowchart illustrating a method in which a user terminal shares a first transparent layer related to content according to an embodiment of the present disclosure.

Referring to FIG. 13, the user terminal may display content synchronized with a display device in operation S13010. The user terminal may overlap the first transparent layer related to the content on the content in operation S13020. Operations S13010 and S13020 may replace an operation of storing the first transparent layer in the user terminal.

Thereafter, the user terminal may transmit the first transparent layer to the display device in operation S13030.

Figure 14:
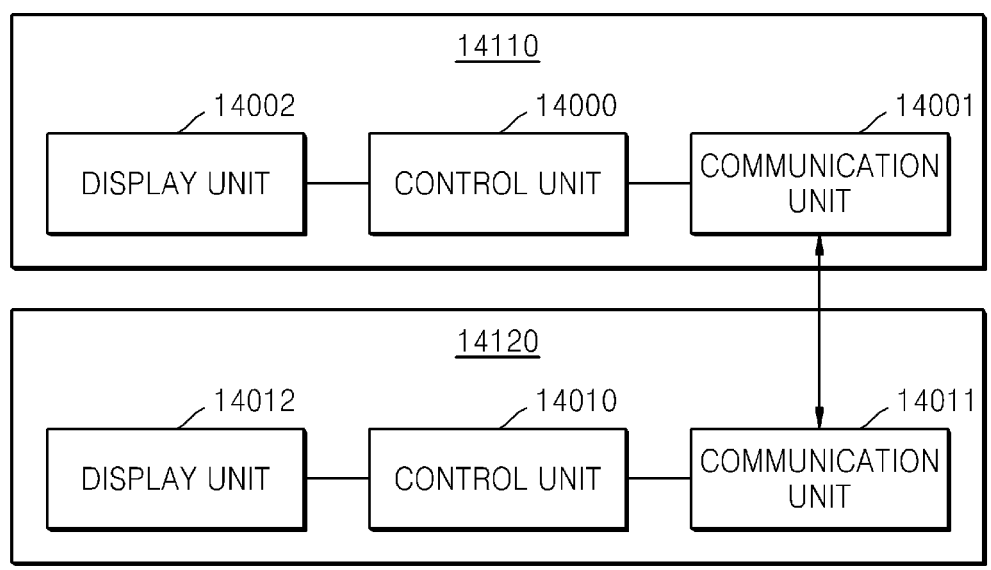
FIG. 14 is a block diagram of a simplified structure of a display device and a user terminal according to an embodiment of the present disclosure.

FIG. 14 is a block diagram of a simplified structure of a display device and a user terminal according to an embodiment of the present disclosure.

Referring to FIG. 14, the display device 14110 may include a display unit 14002 that displays content synchronized with the user terminal 14120, a communication unit 14001 that receives a first transparent layer, including first handwritten information that is input to the user terminal 14120, from the user terminal 14120, and a control unit 14000 that controls the display unit 14002 to overlap the first transparent layer on the content.

The user terminal 14120 may include a display unit 14012 that displays content synchronized with the display device 14110, a control unit 14010 that controls the display unit 14012 to overlap a transparent layer, including first handwritten information, and a communication unit 14011 that transmits the transparent layer to the display device 14110.

Figure 15:
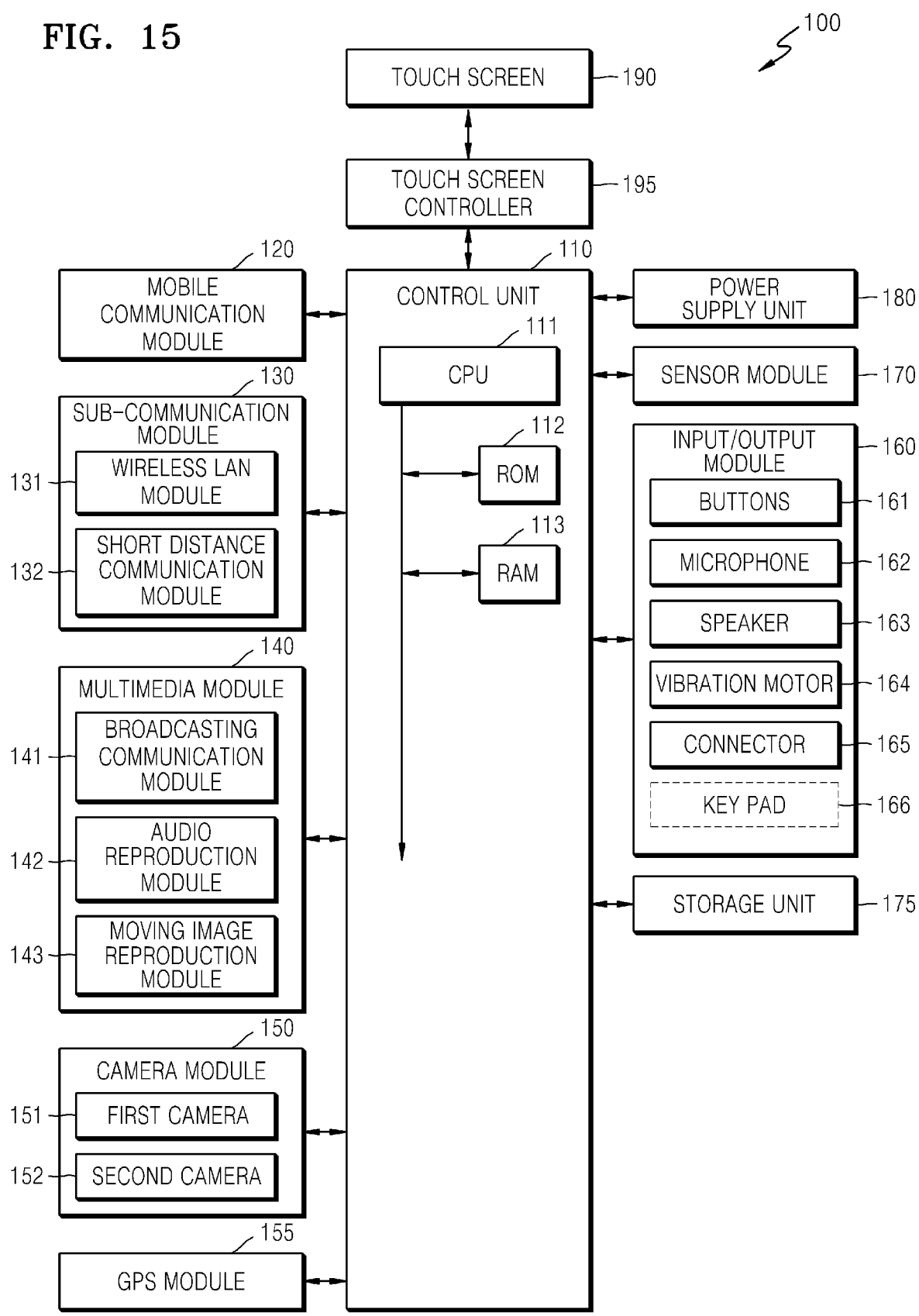
FIG. 15 is a block diagram of a detailed structure of a display device according to an embodiment of the present disclosure.

FIG. 15 is a block diagram of a detailed structure of a display device according to an embodiment of the present disclosure.

FIG. 15 merely shows the display device 100 according to an embodiment. The display device 100 according to the present disclosure may include less or more constitutional elements than those shown in FIG. 15. A user terminal according to an embodiment may also include the constitutional elements shown in FIG. 15.

The display device 100 may be connected to a user terminal (not shown) by using a mobile communication module 120, a sub-communication module 130, and a connector 165. The user terminal may include at least one of another device (not shown), a cellular phone (not shown), a smartphone (not shown), a tablet PC (not shown), and a server (not shown).

Referring to FIG. 15, the display device 100 includes a touch screen 190 and a touch screen controller 195. The display device 100 includes a control unit 110, a mobile communication module 120, a sub-communication module 130, a multimedia module 140, a camera module 150, a Global Positioning System (GPS) module 155, an input/output module 160, a sensor module 170, a storage unit 175, and a power supply unit 180. The sub-communication module 130 includes at least one of a wireless LAN module 131 and a short distance communication module 132. The multimedia module 140 includes at least one of a broadcasting communication module 141, an audio reproduction module 142, and a moving image reproduction module 143. The camera module 150 includes at least one of a first camera 151 and a second camera 152. The input/output module 160 includes at least one of a plurality of buttons 161, a microphone 162, a speaker 163, a vibration motor 164, the connector 165, and a key pad 166. The touch screen 190 may be included in a display unit (not shown). The mobile communication module 120 and the sub-communication module 130 may be included in a communication unit. The touch screen 190 and the touch screen controller 195 may be replaced with a display that does not include a touch sensor. The communication unit may include one of the mobile communication module 120 and the sub-communication module 130.

The control unit 110 may include a CPU 111, Read-Only Memory (ROM) 112 that stores a control program for controlling the display device 100, and Random-Access Memory (RAM) 113 that stores a signal or data input from the outside of the display device 100 or is used as a memory region for a job performed by the display device 100. The CPU 111 may include a single core, a dual core, a triple core, or a quad core or the like. The CPU 111, the ROM 112, and the RAM 113 may be connected to each other via an internal bus, but is not limited thereto.

The control unit 110 may control the mobile communication module 120, the sub-communication module 130, the multimedia module 140, the camera module 150, the GPS module 155, the input/output module 160, the sensor module 170, the storage unit 175, the power supply unit 180, a first touch screen 190a, another touch screen (not shown), and a touch screen controller 195.

The mobile communication module 120 allows the display device 100 to be connected to the external device over mobile communication by using at least one antenna (not shown) according to the control of the control unit 110. The mobile communication module 120 transmits or receives a wireless signal for a voice call, a video call, a Short Message Service (SMS), or a Multimedia Message Service (MMS) to or from a mobile phone (not shown), a smartphone (not shown), a table PC or another device (not shown) having a phone number input to the display device 100.

The sub-communication module 130 may include at least one of the wireless LAN module 131 and the short distance communication module 132. For example, the sub-communication module 130 may include only the wireless LAN module 131, only the short distance communication module 132, or both the wireless LAN module 131 and the short distance communication module 132, but is not limited thereto.

The wireless LAN module 131 may be connected to the Internet via a wireless Access Point (AP) (not shown) according to the control of the control unit 110. The wireless LAN module 131 supports the IEEE wireless LAN standard IEEE802.11x. The short distance communication module 132 may wirelessly perform short distance communication between the display device 100 and an image forming device (not shown) according to the control of the control unit 110. Short distance communication may include Bluetooth, Infrared Data Association (IrDA), etc.

The display device 100 may include at least one of the mobile communication module 120, the wireless LAN module 131, and the short distance communication module 132 according to its performance.

The multimedia module 140 may include the broadcasting communication module 141, the audio reproduction module 142, or the moving image reproduction module 143. The broadcasting communication module 141 may receive a broadcasting signal (for example, a TV broadcasting signal, a radio broadcasting signal, or a data broadcasting signal)

and broadcasting additional information (for example, an Electronic Program Guide (EPG) or an Electronic Service Guide (ESG) sent from a broadcasting station over a broadcasting communication antenna (not shown) according to the control of the control unit 110. The audio reproduction module 142 may reproduce a digital audio file stored or received, according to the control of the control unit 110. The moving image reproduction module 143 may reproduce a digital moving image file stored or received, according to the control of the control unit 110. The moving image reproduction module 143 may reproduce the digital audio file.

The multimedia module 140 may include the audio reproduction module 142 and the moving image reproduction module 143 except for the broadcasting communication module 141. The audio reproduction module 142 of the moving image reproduction module 143 of the multimedia module 140 may be included in the control unit 100.

The camera module 150 may include at least one of the first and second cameras 151 and 152 that capture a still image or a moving image according to the control of the control unit 110. The first camera 151 or the second camera 152 may include an auxiliary light source (for example, flash (not shown)) that provides an amount of light necessary for photographing. The first camera 151 may be disposed in the front of the display device 100. The second camera 152 may be disposed in the rear of the display device 100. As another method, the first camera 151 and the second camera 152 may be disposed to be adjacent to each other (for example, an interval between the first camera 151 and the second camera 152 is from 1 cm to 8 cm) and may capture a 3D still image or a 3D moving image.

The GPS module 155 may receive radio waves from a plurality of GPS satellites (not shown) in an Earth orbit and calculate a location of the display device 100 by using a time of arrival of the radio waves from the GPS satellites (not shown) to the display device 100.

The input and output module 160 may include at least one of the plurality of buttons 161, the microphone 162, the speaker 163, the vibration motor 164, the connector 165, and the key pad 166.

The buttons 161 may be formed in the front, side, or rear of a housing of the display device 100 and may include a power and lock button (not shown), a volume button (not shown), a menu button, a home button, a back button, and a search button.

The microphone 162 receives voice or sound according to the control of the control unit 110 and generates an electrical signal.

The speaker 163 may output a sound corresponding to diverse signals of the mobile communication module 120, the sub-communication module 130, the multimedia module 140, or the camera module 150 according to the control of the control unit 110, to the outside of the display device 100. The speaker 163 may output a sound corresponding to a function performed by the display device 100. A single speaker 163 or a plurality of speakers 163 may be formed at an appropriate location or locations of the housing of the display device 100.

The vibration motor 164 may convert the electrical signal to a mechanical vibration according to the control of the control unit 110. For example, in a case where the display device 100 in a vibration mode receives the voice call from another device (not shown), the vibration motor 164 operates. A single vibration motor 164 or a plurality of vibration motors 164 may be formed in the housing of the display device 100. The vibration motor 164 may operate in response to a user touch operation that touches the touch screen 190 and a continuous touch motion on the touch screen 190.

The connector 165 may be used as an interface for connecting the display device 100 and the external device (not shown) or a power source (not shown). Data stored in the storage unit 175 of the display device 100 may be transmitted to the external device (not shown) or data may be received from the external device (not shown) over a wired cable connected to the connector 165 according to the control of the control unit 110. Power is input from the power source (not shown) or a battery (not shown) may be charged over wired cable connected to the connector 165.

The key pad 166 may receive a key input from a user to control the display device 100. The key pad 166 includes a physical key pad (not shown) formed in the display device 100 or a virtual key pad (not shown) displayed on the touch screen 190. The physical key pad (not shown) formed in the display device 100 may be excluded according to a performance or structure of the display device 100.

The sensor module 170 includes at least one sensor that detects a state of the display device 100. For example, the sensor module 170 may include a proximity sensor that detects whether the user approaches the display device 100, an illumination sensor (not shown) that detects an amount of light in the vicinity of the display device 100, or a motion sensor (not shown) that detects an operation (for example, a rotation of the display device 100, an acceleration or vibration applied to the display device 100, etc.) of the display device 100. The at least one sensor may detect the state of the display device 100, generate a signal corresponding to the detected state, and transmit the signal to the control unit 110. The sensor of the sensor module 170 may be added or deleted according to the performance of the display device 100.

The storage unit 175 may store an input and output signal or data in correspondence with operations of the mobile communication module 120, the sub-communication module 130, the multimedia module 140, the camera module 150, the GPS module 155, the input and output module 160, the sensor module 170, and the touch screen 190 according to the control of the control unit 110. The storage unit 175 may store a control program or an application for controlling the display device 100 or the control unit 110.

The term "storage unit" may include the ROM 112 and the RAM 113 of the control unit 110 or a memory card (not shown) installed in the display device 100. The "storage unit" may include non-volatile memory, volatile memory, a Hard Disk Drive (HDD), or a Solid State Drive (SSD) and the like.

The power supply unit 180 may supply power to a single battery or a plurality of batteries (not shown) disposed in the housing of the display device 100 according to the control of the control unit 110. The single battery supplies or the plurality of batteries (not shown) supply power to the display device 100. The power supply unit 180 may supply power input from an external power source (not shown) to the display device 100 over the wired cable connected to the connector 165, but is not limited thereto.

The touch screen 190 may provide a user interface corresponding to diverse services to the user. The touch screen 190 may transmit an analog signal corresponding to at least one touch input to the user interface to the touch screen controller 195. The touch screen 190 may receive an input of at least one touch through a user's body (for example, a finger) or a touchable input unit (for example, a stylus pen). The touch screen 190 may receive an input of a continuous motion of a single touch from among the at least one touch. The touch screen 190 may transmit an analog signal corresponding to the continuous motion of the input touch to the touch screen controller 195.

The touch input in the present disclosure is not limited to an input via a contact between the touch screen 190 and the user's body or the touchable input unit and may include a non-contact (for example, an interval between the touch screen 190 and the user's body is equal to or smaller than 1 mm) A detectable interval of the touch screen 190 may be changed according to the performance or structure of the display device 100.

The touch screen 190 may be implemented in, for example, a resistive type, a capacitive type, an infrared type, or an acoustic type.

The touch screen controller 195 converts the analog signal received from the touch screen 190 into a digital signal (for example, X and Y coordinates) and transmits the digital signal to the control unit 110. The control unit 110 may control the touch screen 190 by using the digital signal received from the touch screen controller 195. For example, the control unit 110 may select an application execution icon (not shown) displayed on the touch screen 190 or execute an application in response to the touch input. The touch screen controller 195 may be included in the touch screen 190 or the control unit 110.

The one or more various embodiments of the present disclosure may be written as computer programs in a recording medium, e.g., a program module to be executed in computers, which include computer-readable commands. The computer storage medium may include any usable medium that may be accessed by computers, volatile and non-volatile media, and detachable and non-detachable media. Also, the computer storage medium may include a computer storage medium and a communication medium. The computer storage medium includes all of volatile and non-volatile media, and detachable and non-detachable media which are designed to store information including computer readable commands, data structures, program modules or other data. The communication medium includes computer-readable commands, a data structure, a program module, and other transmission mechanisms, and includes other information transmission media. For example, the computer storage medium may be implemented as ROM, RAM, flash memory, CD, DVD, a magnetic disc, or a magnetic tape. The computer storage medium according to an embodiment may store a program for displaying content on a display device, receiving a first transparent layer, including first handwritten information that is input to a first user terminal among user terminals, from the first user terminal, and overlapping the received first transparent layer on the displayed content. The computer storage medium according to another embodiment may store a program for displaying content on a first user terminal, overlapping a first transparent layer, including first handwritten information that is input to the first user terminal, on the display content, and transmitting the first transparent layer to a display device.

The present disclosure may, however, be embodied in many different forms and should not be construed as being limited to the various embodiments set forth herein; rather, these various embodiments are provided so that this disclosure will be thorough and complete, and will fully convey the inventive concept to those of ordinary skill in the art. For example, each constitutional element described in a single element may be dispersed, and likewise constitutional elements described in multiple elements may also be performed in combination.

It should be understood that the various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A content sharing method performed by a display device connected to a plurality of user terminals, the content sharing method comprising:
   displaying content on the display device;
   receiving information included in a transparent layer from each of the plurality of user terminals comprising a first user terminal and a second user terminal;
   displaying a graphic user interface indicating the information on the display device;
   displaying a first button corresponding to the first user terminal and a second button corresponding to the second user terminal in the graphical user interface;
   receiving a first transparent layer output request from the first user terminal;
   displaying the first and second buttons to be distinguished from each other when the first transparent layer output request from the first user terminal is received;
   receiving a user input for selecting first information of the first user terminal, via the first button;
   overlapping a first transparent layer of the first user terminal, including the first information on the displayed content; and
   transmitting, based on the selecting of the first information of the first user terminal, the first information to the second user terminal for controlling the second user terminal to be displaying the first transparent layer on the second user terminal,
   wherein the first information includes a property of the transparent layer indicating the transparent layer is shareable.

2. The content sharing method of claim 1, wherein the first information comprises first handwritten information that is input to the first user terminal.

3. The content sharing method of claim 1,
   wherein the receiving information comprises receiving second information included in a second transparent layer of the second user terminal from the second user terminal, and
   wherein the second information comprises second handwritten information that is input to the second user terminal.

4. The content sharing method of claim 3, further comprising:
   receiving a user input for selecting the second information through the graphic user interface; and
   overlapping the second transparent layer on the content on which the first transparent layer overlaps.

5. The content sharing method of claim 3,
   wherein the displaying of the graphic user interface comprises displaying a first button for receiving a user input of selecting the first information and a second button for receiving a user input of selecting the second information on the display device,
wherein the overlapping of the first transparent layer on the displayed content comprises when information for selecting the first button is input to the display device, overlapping the first transparent layer on the displayed content.

6. The content sharing method of claim 5, wherein the first button indicates identification information of the first user terminal, and the second button indicates identification information of the second user terminal.

7. The content sharing method of claim 1, further comprising, if third handwritten information is input with respect to the first transparent layer, transmitting the third handwritten information to the first user terminal.

8. A non-transitory computer-readable recording medium having recorded thereon a computer program for executing the method of claim 1.

9. A content sharing method performed by a first user terminal that outputs content to share a screen displayed on a display device, the content sharing method comprising:
displaying the content on the first user terminal;
overlapping a first transparent layer of the first user terminal, including first handwritten information that is input to the first user terminal, on the displayed content;
transmitting the first handwritten information to the display device;
transmitting a first transparent layer output request to the display device to allow the display device to distinguish between a first button or a second button;
receiving second information included in a second transparent layer of a second user terminal from the display device based on a selection of the second information of the second user terminal on the display device; and
overlapping the second information on the displayed content,
wherein the transmitting of the first handwritten information to the display device comprises determining a property of the first transparent layer and transmitting the first handwritten information to the display device according to the property of the first transparent layer,
wherein the second information received from the display device comprises
second handwritten information that is input to the second user terminal, and
wherein the property of the first transparent layer indicates if the first transparent layer is shareable.

10. The content sharing method of claim 9, wherein the overlapping of the second information received from the display device on the displayed content comprises replacing the first handwritten information with the second information received from the display device.

11. The content sharing method of claim 9, wherein the first handwritten information further comprises a first identification information of the first user terminal.

12. The content sharing method of claim 10, further comprising:
receiving third handwritten information that is input with respect to a transparent layer of the display device from the display device; and
updating the transparent layer of the display device that overlaps the content based on the third handwritten information.

13. A non-transitory computer-readable recording medium having recorded thereon a computer program for executing the method of claim 9.

14. A display device for sharing content with a plurality of user terminals, the display device comprising:
a display configured to display the content;
a user input interface configured to receive a user input;
a transceiver configured to receive information included in a transparent layer from each of the plurality of user terminals comprising a first user terminal and a second user terminal; and
at least one processor configured to:
control the display to display a graphical user interface indicating the information on the display device,
control the display to display a first button corresponding to the first user terminal and a second button corresponding to the second user terminal in a graphical user interface,
control the transceiver to receive a first transparent layer output request from the first user terminal,
control the display to display the first and second buttons to be distinguished from each other when the first transparent layer output request from the first user terminal is received,
control the user input interface to receive a user input for selecting first information of the first user terminal, via the first button,
control the display to overlap a first transparent layer of the first user terminal, including the first information on the displayed content, and
control the transceiver to transmit, based on the selecting of the first information of the first user terminal, the first information to the second user terminal for controlling the second user terminal to be displaying the first transparent layer on the second user terminal,
wherein the first information includes a property of the first transparent layer indicating the first transparent layer is shareable.

15. The display device of claim 14, wherein the first information comprises first handwritten information that is input to the first user terminal.

16. The display device of claim 14,
wherein the transceiver is further configured to receive second information included in a second transparent layer of the second user terminal from the second user terminal, and
wherein the second information comprises second handwritten information that is input to the second user terminal.

17. The display device of claim 16, wherein the at least one processor is further configured to control the user input interface to receive a user input for selecting the second information through the graphical user interface, and control the display to overlap the second transparent layer on the content on which the first transparent layer overlaps.

18. The display device of claim 16,
wherein the display is further configured to display a first button for receiving a user input of selecting the first information and a second button for receiving a user input of selecting the second information, and
wherein, when information for selecting the first button is input, the at least one processor is further configured to control the display to overlap the first transparent layer on the displayed content.

19. The display device of claim 18, wherein the first button indicates identification information of the first user terminal, and the second button indicates identification information of the second user terminal.

20. The display device of claim 15, wherein, if third handwritten information is input to the first transparent layer the at least one processor transmits the third handwritten information to the first user terminal.

21. A first user terminal that outputs content to share a screen displayed on a display device, the first user terminal comprising:

a display configured to display the content;

at least one processor configured to control the display to overlap a first transparent layer of the first user terminal, including first handwritten information that is input to the first user terminal, on the displayed content; and a transceiver configured to:
transmit the first handwritten information to the display device, and
transmit a first transparent layer output request to the display device to allow the display device to distinguish between a first button or a second button,
wherein the at least one processor is further configured to:
determine a property of the first transparent layer and control the transceiver to transmit the first handwritten information included in the first transparent layer to the display device according to the property of the first transparent layer,
control the transceiver to receive second information included in a second transparent layer of a second user terminal from the display device based on a selection of the second information of the second user terminal on the display device, and
control the display to overlap the second information on the displayed content,
wherein the second information received from the display device comprises second handwritten information that is input to the second user terminal, and
wherein the property of the first transparent layer indicates if the first transparent layer is shareable.

22. The first user terminal of claim 21, wherein the at least one processor is further configured to replace the first handwritten information that overlaps the content with the second information received from the display device.

23. The first user terminal of claim 21, wherein the first handwritten information further comprises a first identification information of the first user terminal.

24. The first user terminal of claim 21,
wherein the transceiver is further configured to receive third handwritten information that is input to a transparent layer of the display device from the display device, and
wherein the at least one processor is further configured to update the transparent layer of the first user terminal that overlaps the content, based on the third handwritten information.

* * * * *